Oct. 30, 1962  H. L. SHAW ETAL  3,061,337
ROTARY FLUID CONNECTOR WITH NON-COMMUNICATING PASSAGEWAYS
Filed March 5, 1958  4 Sheets-Sheet 1
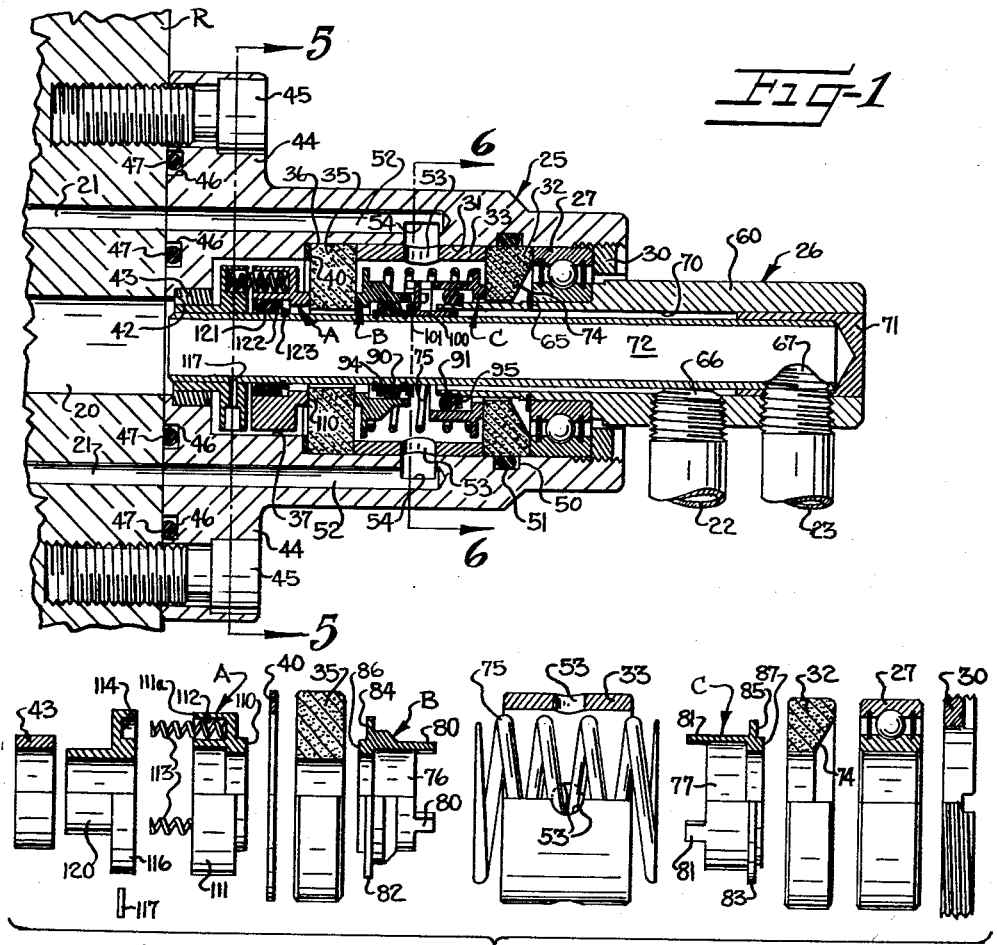
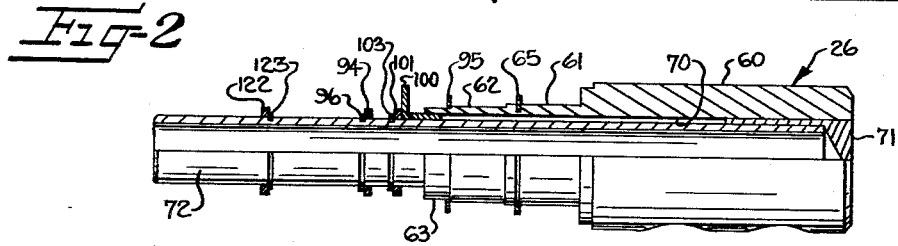
HARMON L. SHAW
and FRANK E. FROST
INVENTORS
BY Eaton, Bell, Hunt + Seltzer
ATTORNEYS Oct. 30, 1962  H. L. SHAW ETAL  3,061,337
ROTARY FLUID CONNECTOR WITH NON-COMMUNICATING PASSAGEWAYS
Filed March 5, 1958  4 Sheets-Sheet 2
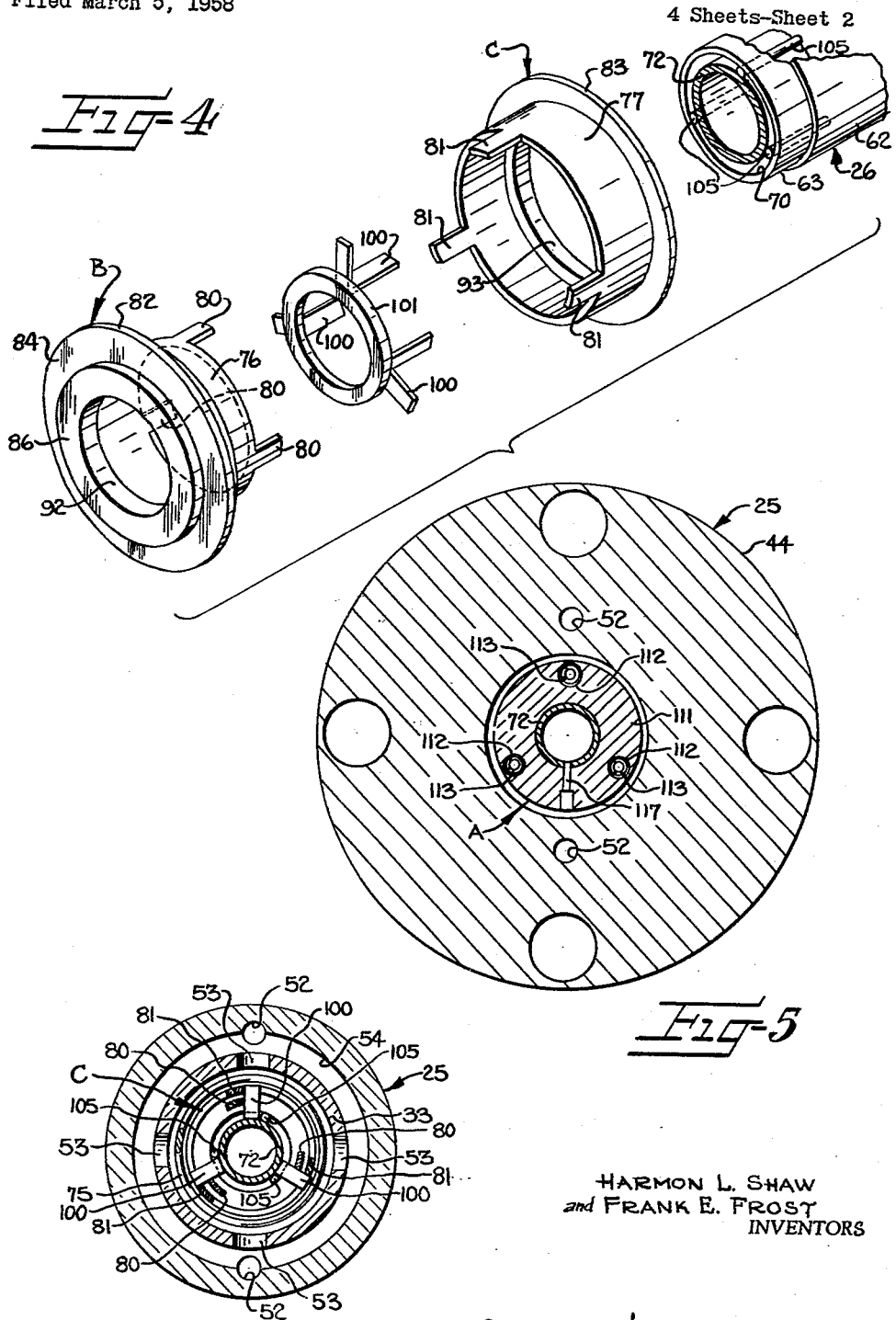
HARMON L. SHAW
and FRANK E. FROST
INVENTORS
BY Eaton, Bell, Hunt + Seltzer
ATTORNEYS

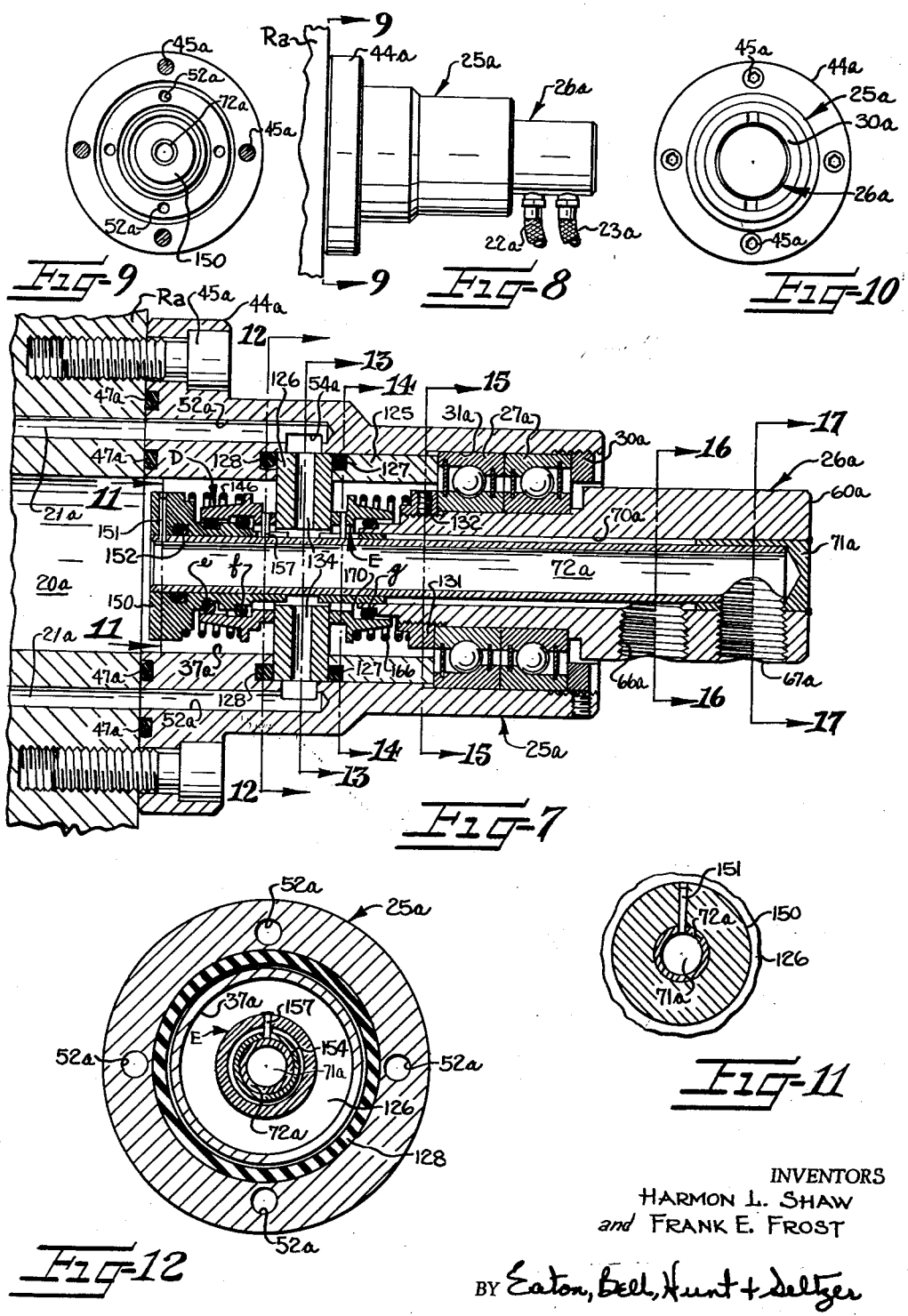

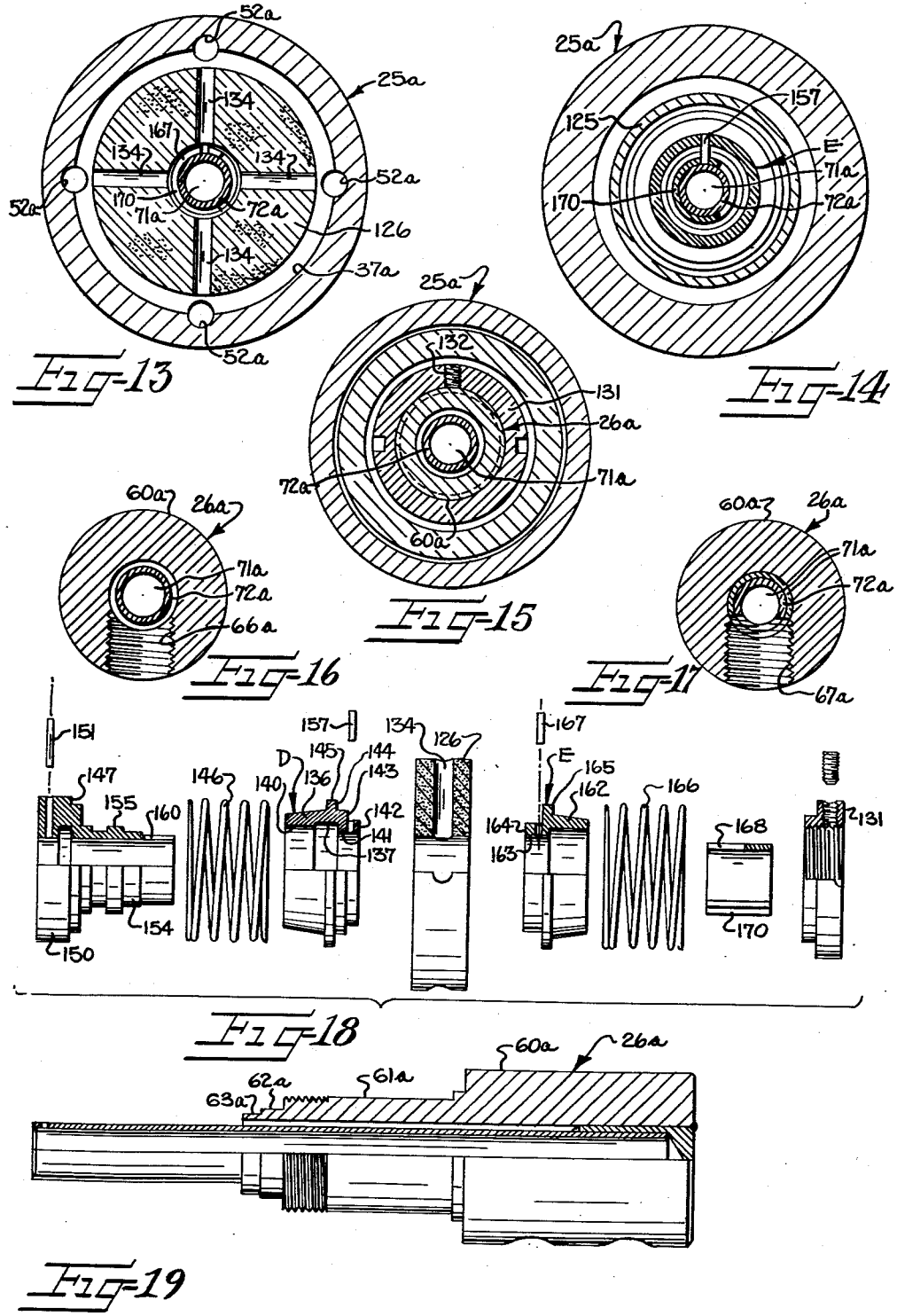

United States Patent Office 3,061,337
Patented Oct. 30, 1962

3,061,337
ROTARY FLUID CONNECTOR WITH NON-COMMUNICATING PASSAGEWAYS
Harmon L. Shaw and Frank E. Frost, Charlotte, N.C., assignors to Perfecting Service Company, Charlotte, N.C., a corporation of North Carolina
Filed Mar. 5, 1958, Ser. No. 719,449
3 Claims. (Cl. 285—134)

This invention generally relates to rotary fluid-transmitting connectors of the type having a rotating housing with a stationary core telescoped therein, wherein non-communicating channels for conducting fluid are formed within the core and the housing. Rotary fluid connectors of the type described are used with double-acting rotary air cylinders to operate chucks or clutches in machine tools, and with heavy machinery, such as presses, cranes, power shovels, etc.

The present invention is particularly concerned with providing an effective seal for rotary connectors or rotary joints having a housing or outer body which must rotate at extremely high speeds about a stationary inner body having a core therewithin, wherein the housing must convey a fluid pressure medium through one or more off-set ports or passageways while the core conveys a fluid pressure medium axially into or out of an open end of the rotating machine member to which the housing is secured. Many attempts have been made to provide an effective means to seal between the relatively rotatable housing and core, but such attempts have commonly resulted in extremely complicated sealing structures which have presented many points of wear between relatively movable parts thereof. In general, the prior art sealing structures are not suitable for use in rotary fluid connectors wherein the housing thereof must rotate at extremely high speeds of the order of 5000–10,000 revolutions-per-minute because of the excessive heat created by the friction between the relatively rotatable sealing surfaces, which heat quickly destroys the effectiveness of the seal.

Rotary fluid connectors of the type embodying the present invention are primarily adapted for use with gaseous fluids, such as air, although other fluids, such as oil, water, etc., may be employed. When gaseous fluids are passed through the rotary fluid connector, the problem of heat created by the friction between the relatively rotatable sealing surfaces is accentuated over that encountered when liquid fluids are present, since the liquids will act in most instances as coolants to dissipate the heat created by friction and to maintain the temperature about the seal in the rotary fluid connector at a lower level. Thus, in the absence of liquids and in instances where gaseous fluids, such as air, must be passed through the rotary fluid connector, prior art sealing structures are prone to create an excessive amount of heat from the friction between their relatively rotatable sealing surfaces leading to their early failure and the consequent failure of the rotary fluid connector.

A rotary fluid connector of the type described is a self-contained unit and, accordingly, must be capable of supporting its own weight as well as the weight of conduits which are connected thereto. Moreover, since a rotary fluid connector generally projects from the machniery with which it is used, it must be sufficiently strong to stand blows and knocks, as it is inevitably subjected to such treatment. For instance, it is common practice for the operator of a machine to use its rotary fluid connector as a "stepping stone" when the operator must climb upon the machine for some purpose, such as for an inspection of certain elements thereof.

In referring to the fact that a rotary fluid connector is a self-contained unit, additional demands are placed upon its sealing components because it is difficult to maintain perfect alinement between the rotary member of the rotary fluid connector and the rotary member of the equipment with which it is used, thus creating possible misalinement between the rotary member and the stationary member of the rotary fluid connector and requiring the use of sealing components in the rotary fluid connector which will provide an effective seal or seals even though some degree of misalinement may occur. Essentially, a rotary fluid connector is a replaceable unit used with a machine which makes it desirable that the rotary fluid connector be capable of quick and easy installation or replacement without the necessity of disassembling the machine with which it is used.

A rotary fluid connector having a plurality of non-communicating passageways therein must be capable of accommodating pressures of different magnitudes within the respective passageways as well as changing temperatures and speeds of rotation. A rotary fluid connector of the type described may be used to convey fluids of different character under different pressures and temperatures to and from a rotary machine member, and the effect of the variable factors mentioned above is to aggravate the already difficult problem of providing a sealing means for the rotary fluid connector which will successfully prevent fluid leakage therefrom while additionally preventing the co-mingling of the fluids in the plurality of passageways therethrough.

Rotary joints or connectors of this character present a particularly knotty problem in that fluid must flow in non-communicating paths within the tubular core thereof and between the core and the inner body and must flow generally radially from between the core and the inner body into and through one or more off-set passageways in the rotary housing, or vice versa, without any leakage of fluid from the rotary fluid connector or between the non-communicating paths or passageways. When it is necessary to employ fluid mediums under extremely high pressures, these pressures are inevitably communicated to the relatively rotatable sealing surfaces forming the seal, causing them to deteriorate or wear rapidly under increased friction caused by the action of the fluid pressure which augments the pressure force of the means holding the sealing surfaces in engagement. Moreover, once again, excessive heat from the increased friction may result, leading directly to the failure of the seal.

It is therefore an object of this invention to provide a mechanical seal for a rotary fluid connector or joint which is so constructed as to overcome the above and other defects; that is, the seal comprises relatively rotatable opposed radial sealing surfaces formed on sealing rings so constructed as to prevent leakage of fluid under high pressure even when the rotating housing of the rotary fluid connector is operated at relatively high speeds; the opposed sealing surfaces remain free from excessive friction due to being so constructed as to impinge against each other under substantially uniform pressure, although the pressure of the fluid medium being transmitted through the rotary fluid connector may vary considerably or may be extremely high. Also, the mechanical seal is so constructed as to automatically compensate for wear without adjustment thereof.

It is another object of this invention to provide a mechanical seal in a rotary fluid connector of the type described utilized for passing gaseous fluids under pressure therethrough, wherein the seal comprises relatively rotatable opposed radial sealing surfaces formed on sealing rings so constructed as to maintain a relatively limited area of contact therebetween and as to impinge against each other under a substantially uniform pressure independent of the pressure of the gaseous fluids being passed through the rotary fluid connector, whereby friction from the relatively rotatable sealing surfaces is kept at a minimum enabling the seal to remain effective by holding the temperature of the heat from such friction within reasonable limits in the absence of liquid coolants.

It is another object of this invention to provide a mechanical seal for a rotary fluid connector of the type described, wherein a plurality of sets of relatively rotatable opposed radial sealing surfaces are maintained in engagement to prevent the co-mingling of the fluid mediums being conducted through the non-communicating passageways formed in the rotary fluid connector, one of each set of sealing surfaces being formed on a sealing ring which is floatingly mounted to compensate for misalignment between the housing and inner body of the rotary fluid connector, and each of said floating sealing rings further being so shaped as to substantially balance the effects of fluid pressure acting thereon whereby the sealing pressures holding the sets of relatively rotatable sealing surfaces in engagement are substantially independent of the fluid pressures contained within the rotary fluid connector.

Some of the objects of the invention having been stated, other objects will appear as the description proceeds when taken in connection with the accompanying drawings, in which—

FIGURE 1 is a longitudinal sectional view through one form of the improved rotary fluid connector constructed in accordance with the present invention;

FIGURE 2 is an axially exploded half elevational and half longitudinal sectional view of those elements shown in FIGURE 1 which encircle the inner portion of the inner body and the core of the connector;

FIGURE 3 is a half elevational and half longitudinal sectional view of the inner or stator body and core removed from the connector;

FIGURE 4 is an enlarged exploded isometric view, partially in section, showing the two stator sealing rings or sleeves and the novel key construction in the central portion of FIGURE 1;

FIGURE 5 is a transverse sectional view taken along line 5—5 in FIGURE 1;

FIGURE 6 is a transverse sectional view taken along line 6—6 in FIGURE 1;

FIGURE 7 is a longitudinal sectional view through a second form of the improved rotary fluid connector;

FIGURE 8 is an elevation of the structure shown in FIGURE 7;

FIGURE 9 is an end elevation taken substantially along line 9—9 in FIGURE 8;

FIGURE 10 is an elevation looking at the right-hand end of the structure shown in FIGURE 8, omitting the conduits;

FIGURE 11 is a transverse sectional view taken along line 11—11 in FIGURE 7;

FIGURE 12 is a transverse sectional view taken along line 12—12 in FIGURE 7;

FIGURE 13 is a transverse sectional view taken along line 13—13 in FIGURE 7;

FIGURE 14 is a transverse sectional view taken along line 14—14 in FIGURE 7;

FIGURE 15 is a transverse sectional view taken along line 15—15 in FIGURE 7;

FIGURE 16 is a transverse sectional view taken along line 16—16 in FIGURE 7;

FIGURE 17 is a transverse sectional view taken along line 17—17 in FIGURE 7;

FIGURE 18 is an exploded half elevational and half longitudinal sectional view of those elements in FIGURE 7 which surround the inner portion of the inner body and the core of the connector;

FIGURE 19 is a half elevational and half longitudinal sectional view of the inner or stator body and core removed from the second form of the rotary fluid connector.

Referring more specifically to the drawings, the first form of the improved rotary fluid connector is shown in FIGURE 1 as being connected to a rotary member R, such as a rotating air cylinder or the like, having a plurality of fluid channels 20 and 21 therein, the rotary fluid connector serving to connect said channels with separate conduits 22 and 23. It will be noted that the channel 20 is disposed centrally with respect to the longitudinal axis of the rotary fluid connector at one end thereof, and the channel or channels 21 are disposed substantially parallel to but in off-set relation to the central channel 20. The rotary member R may be in the form of a shaft, a double acting cylinder, or any other machine into and out of which separate fluid mediums under a relatively high pressure are conducted and wherein the rotary member is operated at relatively high speeds. The first form of rotary fluid connector is shown in FIGURES 1 through 6 and comprises a housing broadly designated at 25 which may also be termed as an outer body, main body or rotor.

The inner portion of a stationary fluid conduit, inner body or stator broadly designated at 26 is journaled in the main body or housing 25 by suitable means, such as an anti-friction bearing 27 which is retained within one end of the housing 25 by a retaining ring 30 threaded within said one end of the housing 25 and engaging the outer race of the bearing 27. The bearing 27 is preferably in the form of a self-sealed radial thrust ball bearing.

The outer race of the bearing 27 fits in a large axial bore or a chamber 31 and is held against the outer planar surface of an outer incompressible annular rotary seal seat or face ring 32 by the retaining ring 30. The outer seal seat 32 fits relatively snugly within the bore 31 and its inner radial or planar surface bears against one end of an elongated spacing sleeves 33 which also fits snugly within the chamber or bore 31. The other end of the sleeve 33 engages the outer radial surface of an inner incompressible annular rotary seal seat or face ring 35. The spacing sleeve 33 holds the inner seal seat 35 against an annular shoulder 36 in the housing 25 formed by an intermediate bore 37 of smaller diameter than the bore 31. A washer 40 is preferably, but not necessarily, positioned between the inner seal seat 35 and the shoulder 36. The inner or left-hand end of the housing 25 in FIGURE 1 has a restricted bore or opening 42 therein in which a bushing sleeve 43 is secured, as by a pressed fit. The bushing sleeve 43 is preferably made from hardened steel.

The main body or housing 25 may be secured to the rotary member R in any desired manner. In this instance, the inner end of the housing 25 is shown as having a flange 44 through which a plurality of screws 45 extend for securing the same to the rotary member R. In order to provide a pressure-tight seal between the rotary member R and the inner end of the housing 25, the inner end of the housing 25 may be provided with one or more annular grooves 46 therein, two such grooves being shown in FIGURE 1, and in each of which a suitable resilient packing, such as an O-ring seal 47, is positioned. The O-rings 47 are adapted to be compressed to seal between the rotary member R and the housing 25 as these elements are tightly secured together by the screws 45. It will be noted that the O-rings 47 are so positioned to prevent fluid leakage between the central channel 20 and the channel or channels 21 formed in the rotary member R. Similarly, the wall of the bore 31 is provided with a shallow groove 50 in which a resilient packing, such as an O-ring seal 51, is positioned, to seal between the outer periphery of the seal seat or face ring 32 and the wall of the bore 31, the width of the groove 50 being less than the thickness of the seal seat 32.

It will be noted that the opening 42 coincides with the central channel 20 in the rotary member R and that the housing 25 is also provided with a plurality of off-set substantially axially extending passageways 52 which coincide with the corresponding passageways or channels 21 in the rotary member R. The spacing sleeve 33 has a plurality of substantially radially extending passageways or ports 53 therethrough which communicate with the off-set passageways 52 by means of an annular groove or chamber 54 formed in the wall of the bore 31 (FIGURES 1 and 6). The parts described heretofore constitute the rotating elements of the rotary fluid connector.

As best shown in FIGURES 1 and 3, the inner body or stator 26 includes an enlarged cylindrical body portion 60 and stepped cylindrical portions 61, 62 and 63 of progressively reduced diameter. The stepped portion 61 is positioned within the inner race of the antifriction bearing 27, there being a shoulder formed between the body portion 60 and the stepped portion 61 against which the outer radial surface of the inner race is positioned. The outer radial surface of the inner race is held against said shoulder by a snap ring 65 secured in the stepped portion 61 and engaging the inner radial surface of the inner race. Thus, it will be observed that the body portion 60 of the stator 26 extends outwardly beyond the outer end of the housing 25. The body portion 60 is provided with a pair of ports 66 and 67 located outwardly from the housing 25 which ports are preferably threaded for receiving corresponding ends of the conduits 22 and 23. The stator 26 is provided with a longitudinally extending axial bore 70 which is closed at its outer end by a cap or closure member 71 suitably secured to or formed integral with the body portion 60. The closure member 71 has a fluid conducting tube or core 72 fixed therein, as by a press fit, and it will be noted that the port 67 extends through corresponding portions of the cap or closure member 71 and the core 72. Thus, the port 67 establishes communication between the interior of the tubular core 72 and the conduit 23. On the other hand, the port 66 communicates only with the bore 70 so that fluid, when conducted through the conduit 22, will flow between the core 72 and the wall of the bore 70 in the inner body or stator 26.

It will be noted in FIGURES 1 and 2 that the outer radial surface of the outer seal seat 32 is recessed along its inner portion, as at 74, to accommodate the snap ring 65. The seal seat 32 has a substantially larger internal diameter than the diameter of the stepped reduced portion 62 of the stator 26 which it encircles, thus insuring free relative rotational movement between the outer seal seat 32 and the stator 26.

Moreover, the inner end of the inner body or stator 26 terminates in a radial plane in spaced relation between the two seal seats 32 and 35 while the tube or core 72 extends substantially beyond the inner end of the stator 26 and preferably terminates closely adjacent the inner end of the housing 25. The internal bore of the inner seal seat 35 is also of substantially greater diameter than the diameter of the core 72 to further insure freedom of relative rotational movement therebetween.

The rotary fluid connector of this invention is intended to utilize a central fluid conducting passageway independently of an off-set fluid conducting passageway or passageways, which passageways are adapted to communicate with the central channel 20 and the off-set channel or channels 21 in the rotary member R, respectively. It is apparent that the fluid mediums conducted through these passageways may be at the same or different pressures and of the same or different character, since the central passageway is maintained independently of the off-set passageway or passageways. In order to prevent leakage of the fluid medium being conducted through the central passageway into the off-set passageway or passageways and vice versa with a consequent loss of efficiency and/or power in the rotary member R, a novel sealing arrangement is provided. In this connection, it will be noted that fluid may flow between and within the off-set passageways 52 and the bore 70 in the inner body or stator 26. In so doing, the fluid must flow through the space between the outer and inner seal seats 32, 35. At the same time, a separate fluid medium may flow through the interior of the core 72.

To this end, it will be observed in FIGURE 1 that opposite radial surfaces of the inner seal seat 35 are engaged by respective stator sealing rings or sleeves A and B while the inner radial surface of the outer seal seat 32 is engaged by a stator sealing ring or sleeve C. The sealing rings A, B and C are stationary to the extent that they do not rotate upon the rotation of the housing 25 and the other rotary elements heretofore described. However, the sealing rings A, B and C are axially movable, being resiliently urged into engagement with the opposed radial surfaces of the corresponding seal seats 35 and 32.

In order to minimize frictional contact between the stator sealing rings and the corresponding seal seats, the radial surfaces of the sealing rings which engage the seal seats are relatively thin or narrow and the outer peripheral surfaces of the sealing rings A, B and C are of irregular configuration to provide opposing pressure surfaces thereon so as to substantially balance the pressures applied to each of the sealing rings A, B and C in both directions axially thereof as effected by the pressurized fluid medium while accommodating spring means, such as a coil spring 75 which, in itself, applies optimum operating pressure to the sealing rings B, C and the springs 113 which function likewise with respect to sealing ring A. Thus, in view of the fact that the irregular surfaces of the sealing rings A, B and C are important to maintain substantially uniform sealing pressure, reference characters will not be applied to these particular surfaces in FIGURE 1, but reference will be made to FIGURES 2, 3, 4 and 6 for identification of the irregular surfaces of the sleeves or stator sealing rings A, B and C.

It will be observed in FIGURES 2 and 4 that the sealing rings B and C comprise respective relatively thin annular bodies or barrel portions 76 and 77, respectively, which are provided with respective axially extending circularly spaced prongs or projections 80 and 81 on the proximal ends thereof. It will be noted that the prongs 81 of the sealing ring C are of substantially greater internal diameter than the external diameter of the prongs 80 of the sealing ring B to permit the prongs 81 to overlap the prongs 80 when the sealing rings B and C are assembled as shown in FIGURE 1. The sealing rings B and C are provided with respective annular radially extending flanges or ridges 82, 83 thereon which are located on the distal ends of the sealing rings B and C to provide respective pressure balancing radial surfaces 84 and 85 on the sealing rings B and C, thereby defining relatively narrow sealing noses having radial sealing surfaces 86 and 87 thereon. Resilient packing seals, such as O-rings 90 and 91, are positioned between the barrel portions 76 and 77 and the core 72 and the reduced stepped portion 63 of the stator or inner body 26, respectively, to resiliently mount the sealing rings B and C for limited radial floating movement while sealing between the same and the core 72 and the inner body 26. The radial bearing or sealing surfaces 86 and 87 have the smallest practical surface area, the distal ends of the sealing rings B and C, along their inner axial surfaces, being provided with respective shoulders 92 and 93 effecting the desired surface area for the sealing surfaces 86, 87 while minimizing the internal and external diameters thereof. It is desirable that the sealing noses defining the sealing surfaces 86 and 87 have a relatively small outer diameter since the surface speed of rotation of the opposing radial surfaces on the seal seats 32 and 35 progressively decreases from the outer peripheral portions thereof inwardly. It will be observed in FIGURES 1 and 2 that the O-rings 90 and 91 are limited in their axial movement toward the respective seal seats 35 and 32 while under the influence of fluid pressure by means of respective stop rings 94 and 95, the stop ring 95 being seated against the shoulder formed at the juncture between the stepped portions 62, 63 of the stator 26, and the stop ring 94 being seated against a snap ring 96 fitting in a corresponding groove in the tube or core 72. By providing the stop rings 94 and 95 for the O-rings 90 and 91, it will be seen that the fluid pressure within the chamber 31 which acts upon the O-rings is not transmitted to the shoulders 92 and 93 of the sealing rings B and C, respectively.

It will be understood that, in resiliently mounting the sealing rings B and C by means of the O-rings 90 and 91, respectively, the sealing rings B and C are thereby spaced to a limited extent from the core 72 and the reduced stepped portion 63 respectively. This spaced relationship allows a limited canting movement on the part of the sealing rings B and C to permit the radial sealing surfaces 86 and 87 formed thereon to be maintained in engagement with the proximal radial surfaces of the inner and outer seal seats 35, 32 even though some degree of misalinement may be present between the rotary housing 25 and the inner body or stator 26.

It is apparent that the annular radial flanges 82 and 83 form seats for opposite ends of the compression spring 75 and, since the surface of the annular radial flange 82 against which one end of the spring 75 is seated has a somewhat greater radial extent than the surface of the annular radial flange 83 against which the opposite end of the spring 75 is seated, the pressure balancing radial surface 84 defined by the annular radial flange 82 on sealing ring B is of somewhat greater radial extent than that of the pressure balancing radial surface 85 on sealing ring C. In other words, the surfaces 84 and 85 of the respective sealing rings B and C have areas which are substantially equal to their respective oppositely facing surfaces for substantially balancing the sealing rings B and C against the effects of fluid pressure in the chamber 31.

Thus, the fluid pressure within the chamber 31, housing the sealing rings B and C, applies the same or substantially the same axially directed force against the proximal radial surfaces of the sealing rings B and C as it applies against the distal pressure balancing radial surfaces 84, 85 of the sealing rings B and C respectively. It follows, therefore, that the coil spring 75 determines the amount of pressure urging the radial sealing surfaces 86 and 87 into engagement with the proximal radial surfaces of the inner and outer seal seats 35 and 32, substantially independently of the fluid pressure in chamber 31 and regardless of the magnitude of such fluid pressure or any variations therein.

In order to permit fluid to flow between the proximal ends of the barrel portions 76 and 77 of the sealing rings B and C in the chamber 31 while restraining the sealing rings B and C against rotation with the housing 25, the tube 72 is surrounded by a plurality of circularly spaced substantially L-shaped keys 100, the number of which preferably corresponds to the number of prongs 80 and 81 on the barrel portions 76 and 77 of the respective sealing rings B and C. In order to maintain the keys 100 in the desired spaced relationship, they are rigidly fixed to a common key-supporting ring 101, as by being welded thereto or being formed integral therewith. The key-supporting ring 101 encircles the tube or core 72 and is positioned in such a manner as to permit the radial portions of the keys 100 to project radially between the circularly spaced prongs 80 and 81 of the respective sealing rings B and C.

It will be apparent that the circularly spaced prongs 80 and 81 of the sealing rings B and C abut correspondingly radial portions of the L-shaped keys 100 to prevent the rotation of the sealing rings B and C. The key supporting ring 101 and the keys 100 supported thereon are limited in their inward axial movement relative to the core 72 by suitable means, such as a snap ring 103 inserted in a suitable groove formed in the core 72. It will be seen that the snap ring 103 is adapted to abut the key supporting ring 101 to prevent any further inward axial movement of the ring 101 and the keys 100 supported thereon. The axial portions of the L-shaped keys 100 may be secured or keyed to the tubular core 72 in any desired manner. However, in order to minimize the thickness of the wall of the tubular core 72 and to obviate the necessity of broaching the bore 70 in the inner body 26, a plurality of circularly spaced pins or bars 105 are provided between the proximal surfaces of the core 72 and the innermost end portion of the inner body 26. The pins 105 are spaced in substantial conformity with the projections 81 on the barrel portion 77 of the sealing ring C and may be secured to either the inner body 26 or the core 72, or both, by any suitable means, such as welding.

It will be noted that the distance between adjacent pins 105 is substantially greater than the width of the axial portions of the keys 100 so as to permit fluid to flow between the keys 100 and the pins 105 as it passes between the proximal portions of the core 72 and the inner body 26. It is also apparent that the radially extending portions of the L-shaped keys 100 are substantially narrower than the distance between adjacent prongs 80 and 81 on the respective sealing rings B and C to permit the fluid to flow between the proximal overlapping portions of the sealing rings B and C.

Referring to the sealing ring A, it will be noted that this sealing ring is disposed in the chamber or bore 37, which contains pressurized fluid coming from the pressure fluid passing through the interior of the core 72 and conducted to or from the central channel 20 in the rotary member R. The sealing ring A is provided with a narrow sealing nose having a radial sealing surface 110, preferably of substantially the same area as the sealing surfaces 86 and 87 of the sealing rings B and C, and an enlarged cylindrical barrel portion 111.

The barrel portion 111 is axially spaced from the seal seat 35 to define a pressure balancing radial surface 111a and is provided with circularly spaced cavities 112 therein for the reception of corresponding ends of a plurality of compression springs 113. The opposite ends of the compression springs 113 are seated in corresponding cavities 114 provided in a collar member 116. The collar member 116 is suitably secured on the innermost end of the tube or core 72, as by a locking pin 117, to restrain it against rotation. The collar member 116 has a reduced sleeve portion 120 integral therewith which is received within the bushing 43 heretofore described, the bushing 43 being rotatable with respect thereto.

It will be understood that the circularly spaced sets of cavities 112 and 114 formed in the barrel portion 111 of the sealing ring A and the collar member 116, in addition to housing the opposite ends of the springs 113, also act in conjunction therewith to prevent relative rotation between the sealing ring A and the collar member 116. It is apparent, therefore, that the sealing ring A is also restrained against rotation.

The sealing ring A is sealed with respect to the core 72 by means of a resilient annular packing, such as an O-ring 121, which is adapted to be pressed against a washer 122 by the fluid pressure in the chamber 37. The washer 122, in turn, abuts a snap ring 123 inserted in a suitable groove formed in the core 72 to limit the axial movement of the washer 122 toward the outer end of the core 72. By providing the washer or stop ring 122 for the O-ring 121, it will be seen that the fluid pressure within the chamber 37 which acts upon the O-ring 121 is not transmitted to the sealing ring A.

Thus, the pressure balancing radial surface 111a of the sealing ring A has an effective pressure area which is substantially equal to that of the radial end surface of the barrel portion 111 facing in the opposite direction toward the innermost end of the core 72. It is apparent, therefore, that the fluid pressure within the chamber 37 housing the sealing ring A applies the same or substantially the same axially directed force against the pressure balancing radial surface 111a as it applies against the radial end surface of the barrel portion 111 facing in the opposite direction. It follows that the plurality of compression springs 113 determine the amount of pressure urging the radial sealing surface 110 of sealing ring A into engagement with the proximal radial surface of the inner seal seat 35, substantially independently of the fluid pressure in chamber 37 and regardless of the magnitude of such fluid pressure or any variations therein.

As in the case of sealing rings B and C, the sealing ring A is spaced to a limited extent from the core 72 by means of the O-ring 121 associated therewith to allow a limited canting movement of the sealing ring A with respect to the core 72, thereby permitting the radial sealing surface 110 formed thereon to be maintained in engagement with the proximal radial surface of the inner seal seat 35 even though some degree of misalinement may be present between the rotary housing 25 and the inner body or stator 26.

It is apparent that the fluid pressure medium may flow in one direction through the tube or core 72 while flowing in the opposite direction through the passageway defined by the communicating passages 52, 54, 53, the chamber 31 between the seal seats 32 and 35, and the passage between the bore 70 and the exterior of the tube 72. It is also apparent that fluid may flow in the same direction through both of the non-communicating channels or passageways heretofore described. In either event, the pressure of the fluid flowing through the chamber 31 defined between the seal seats 32 and 35 imparts substantially balanced pressures in both directions axially of each of the sealing rings B and C and the same is true with respect to sealing ring A in chamber 37.

It is thus seen that the spring 75 and the springs 113 maintain a uniform pressure substantially independent of the prevailing fluid pressure between the radial sealing surfaces of the sealing rings A, B and C and the corresponding radial surfaces of the seal seats 35 and 32 at all times, resulting in greatly extending the life of the seal seats 35 and 32 as compared to the seal seats of prior rotary fluid connectors of this character while holding the friction between the relatively rotating engaged sealing surfaces and the heat created thereby to a minimum. It is further apparent that the springs 75 and 113 compensate for wear of the sealing surfaces without the necessity of adjustment. It is contemplated that the sealing rings A, B and C and seal seats 32, 35 may be made from various materials having good wearing characteristics with low frictional tendencies. By way of a preferred example, the sealing rings A, B and C may be made from hardened steel and the seal seats 32 and 35 may be made from a carbon or graphite material or compositions thereof.

Second Form of the Invention

The second form of rotary fluid connector embodying the principles of the present invention is shown in FIGURES 7 through 19 and, since many of the parts thereof are quite similar to parts of the first form of the invention shown in FIGURES 1 through 6, those parts shown in FIGURES 7 through 19 which are similar to parts of the first form of the invention shown in FIGURES 1 through 6 shall bear the same reference characters with the small letter "a" affixed thereto, in order to avoid repetitive description.

The second form of rotary fluid connector differs from the first form primarily in that only a single face ring or seal seat is employed, the seal seat being provided with substantially radially extending channels or perforations therein through which the fluid passes from between the core and the wall of the bore in the inner body to the off-set passageways in the housing. Although the end of the core adjacent the rotary member in the second form of the invention may be supported in the same manner as it is in the first form of the invention— namely, by the single anti-friction bearing 27 and the bushing sleeve 43, it is shown as being positioned out of contact with the rotating housing, two anti-friction bearings being used for rotatably supporting the housing on the inner body or stator in the second form of the invention.

The housing 25a (FIGURE 7) is similar to the housing 25 (FIGURE 1) to the extent that its external configuration is substantially the same and it is also provided with one or more off-set passageways 52a which communicate with the annular groove or chamber 54a. Furthermore, the housing 25a is provided with a relatively large bore or chamber 31a in which the two anti-friction bearings 27a are held against a spacing sleeve 125 by a retaining ring 30a threaded into the outer end of the bore 31a. The inner end of the spacing sleeve 125 bears against an incompressible face ring or seal seat 126 preferably made from graphite, carbon or compositions thereof, the seal seat 126, in turn, fitting against a shoulder formed at the juncture of the bore 31a with the bore 37a of reduced diameter relative to the bore 31a.

It will be noted that the bore 37a extends to the inner face of the rotary fluid connector rather than being restricted as is the case in the first form of the invention. The seal seat 126 is maintained in sealing engagement with the wall of the bore 31a by any suitable packing means, such as a pair of resilient annular seals or O-rings 127 and 128, the proximal ends of the shoulder at the juncture of the bores 31a and 37a, and the sleeve 125, being suitably recessed for reception of the O-rings 127 and 128. It will be noted that the inner races of the two bearings 27a are held against each other and the outer radial surface of the inner race of the outer bearing 27a is held in engagement with the shoulder formed by the juncture of the body portion 60a with the reduced stepped portion 61a by means of an internally threaded collar 131 threaded onto the free end of the stepped portion 61a. The collar 131 is shown in the form of a spanner nut in FIGURE 15 and may be locked in the desired position by means of a set screw 132.

The seal seat 126 is of substantially greater internal diameter than the external diameter of the tube 72a, which tube is quite similar to the tube 72 of the first form of the invention. It will be noted that the seal seat 126 has a plurality of substantially radially extending channels, passageways or perforations 134 therein which communicate with the annular groove or chamber 54a. Thus, assuming that a fluid pressure medium is being introduced into the port 66a, it then flows through the bore 70a and around the tube or core 72a, passing between the seal seat 126 and the core 72a and, thus, outwardly through the passageways 134, 54a and 52a into the channels 21a of the rotary member Ra.

As is the case in the first form of the invention, the open end of the core 72a terminates closely adjacent the innermost end of the housing 25a—that is, adjacent the rotary member Ra. Thus, the pressure in the central channel 20a of the rotary member Ra is also transmitted into the bore 37a. Therefore, a sealing ring D is provided to prevent the fluid from leaking between the tube or core 72a and the seal seat 126 into the bore 37a or vice versa, which sealing ring also embodies the novel pressure balancing surfaces described with respect to the sealing rings A, B and C of the first form of the invention.

A sealing ring E is also provided at the right-hand side of the seal seat 126 to prevent fluid from flowing into the space adjacent the anti-friction bearings 27a, it being noted that the inner end of the stator or inner body 26a terminates short of the seal seat 126.

In order to avoid obscuring the parts in the central portion of FIGURE 7 by too many reference characters, the sealing rings D and E and adjacent elements will be described in detail with reference being made to FIGURES 11 through 19. The sealing ring D comprises a tubular barrel portion 136 having an annular groove 137 in its inner periphery 140 and a sealing nose 141 off-set radially inwardly with respect to the barrel portion 136. The sealing nose 141 of sealing ring D forms a radial sealing surface 142 thereon and defines, in conjunction with the barrel portion 136, a radial end surface 143.

Another radial surface 144 is provided by an annular projection or flange 145 extending radially outwardly from the barrel portion 136, the radial surfaces 142, 143 and 144 being in stepped relationship. One end of a compression spring 146 is seated against the opposite radial surface formed on the flange 145. The other end of the compression spring 146 seats against a shoulder 147 formed on a collar member 150. The collar member 150 is suitably secured on the innermost end of the core 72a, as by a locking pin 151, to be restrained against rotation relative to the core 72a. A suitable packing means, such as a resilient O-ring seal 152 (FIGURE 7) is provided between the collar member 150 and the tubular core 72a to prevent leakage of fluid therebetween.

It will be noted that the collar member 150 has a reduced tubular extension 154 thereon which is provided with an enlarged medial portion or ridge 155. The diameter of the inner periphery 140 on the barrel portion 136 of the sealing ring D is substantially greater than the outer diameter of the ridge 155 on the collar member 150. On the other hand, the sealing nose 141 has a lesser internal diameter than the diameter of the inner periphery 140, but is of substantially greater diameter than the tubular extension 154 itself of the collar member 150.

Thus, the enlarged medial portion or ridge 155 on the tubular extension 154 of the collar member 150 serves to restrain a pair of O-rings e and f, which encircle the tubular extension 154, from substantial axial movement. It will be noted that the inner periphery 140 on the barrel portion 136 of the sealing ring D engages the outer surface of the O-ring e while the bottom of the annular groove 137 formed in the sealing ring D is engaged by the O-ring f, the groove 137 being of substantially greater axial length than the cross-sectional diameter of the O-ring f so as to permit axial movement of the sealing ring D.

Suitable means are provided for keying the sealing ring D to the tubular core 72a, thereby restraining the sealing ring D against rotation while permitting axial movement relative to the core 72a. To this end, the sealing nose 141 of the sealing ring D is provided with a pin 157 therein which projects radially inwardly and loosely penetrates an axially elongated key slot 160 formed in the free end of the reduced tubular extension 154 on the collar member 150 (FIGURES 12 and 18). Thus, it will be seen that the stepped radial surfaces 143 and 144 formed on the sealing ring D act as pressure balancing surfaces having a combined effective pressure area which is substantially equal to that of the oppositely facing radial surfaces on the sealing ring D. Accordingly, the fluid pressure within the chamber 37a housing the sealing ring D applies the same or substantially the same axially directed force against the pressure balancing surfaces 143 and 144 on sealing ring D as it applies against the oppositely facing radial surfaces thereon. The compression spring 146, therefore, determines the amount of pressure urging the radial sealing surface 142 of sealing ring D into engagement with the proximal radial surface of the seal seat 126 substantially independently of the fluid pressure in chamber 37a.

It will be noted that the fluid pressure within the chamber 37a which acts upon the O-ring e cannot be transmitted to the sealing ring D because of the ridge 155 formed on the reduced tubular extension 154 of the collar member 150. The O-ring e is urged axially into abutment with a side wall of the ridge 155 by fluid pressure within the chamber 37a, the ridge 155 being effective to absorb the axial thrust of such pressure. Similarly, fluid pressure passing through the perforations 134 in the seal seat 126 and present in the space between the seal seat 126 and the core 72a cannot be transmitted to the sealing ring D in a direction tending to force it way from the seal seat 126, the axial thrust of the pressure in this direction urging O-ring f against the opposite side wall of ridge 155 and being absorbed thereby.

The sealing ring E adjacent the opposite radial sealing surface of the seal seat 126 also comprises a substantially tubular barrel portion 162 and an annular sealing nose 163 at one end of the barrel portion 162 off-set radially inwardly with respect thereto. The sealing nose 163 forms a radial sealing surface 164 on sealing ring E adapted to engage the proximal radial sealing surface of the seal seat 126.

The outer periphery of the barrel portion 162 has an annular projection or flange 165 thereon which serves as a seat for one end of a compression spring 166. Since there is no appreciable fluid pressure in the chamber housing the sealing ring E, it is not necessary to provide opposing pressure balancing surfaces on the sealing ring E although such is shown in the drawings. The other end of the compression spring 166 bears against the nut 131 which retains the bearings 27a in place.

It will be noted that the internal diameter of the barrel portion 162 of the sealing ring E is such as to loosely encircle the reduced stepped portion 62a of the inner body or stator 26a. The stepped portion 63a at the innermost end of the inner body 26a is encircled by an O-ring g which seals between the inner surface of the barrel portion 162 of the sealing ring E and the stepped portion 63a. The shoulder at the juncture of the stepped portions 62a and 63a limits the extent of axial movement of the O-ring g toward the outer end of the inner body 26a under the influence of fluid pressure present in the space between seal seat 126 and the core 72a.

In order to permit axial movement of the sealing ring E while preventing the rotation thereof relative to the core 72a and inner body 26a, the sealing ring E is keyed relative to the tubular core 72a. To this end, the sealing nose 163 of the sealing ring E has a pin 167 therein which projects radially inwardly and loosely penetrates an axially elongated key slot 168 formed in an arcuate sleeve 170 suitably secured to either the wall of the bore 70a in the inner body 26a or to the tube 72a, or both, as by welding. As shown in FIGURE 14, the arcuate sleeve 170 approximates a C in transverse cross-section so as to provide a relatively large space between opposite edges thereof through which the fluid pressure medium may pass.

It is thus seen that the fluid may flow in either direction in the non-communicating channels or passageways, one of which is formed by the interior of the tubular core 72a and the other of which is formed between the exterior of the core 72a and the wall of the bore 70a. It is apparent that the fluid, if introduced through the port 66a, will flow externally of the tube 72a, through the space between opposite edges of the arcuate sleeve 170, and within the bore defined by the seal seat 126, from whence it passes through the radial perforations 134 therein and thus through the annular groove 54a and the off-set passageways 52a into the channels 21a of the rotary member Ra.

As in the first form of the invention, the sealing rings D and E are resiliently mounted about the inner body or stator 26a by the O-rings e, f and g respectively, thereby allowing a limited canting movement on the part of the sealing rings D and E about the inner body or stator 26a to permit the radial sealing surfaces 142 and 164 formed thereon to be maintained in engagement with the opposite sides of the seal seat 126, even though some degree of misalinement may be present between the rotary housing 25a and the inner body or stator 26a.

It is thus seen that there has been disclosed a novel rotary fluid connector having a seal which is so constructed as to minimize frictional contact between relatively rotatable parts thereof and, accordingly, making it possible to rotate the housing of the rotary fluid connector at an extremely high rate of speed without producing excessive heat between the relatively rotating parts. Further, it is seen that the novel self-adjusting sealing rings are so positioned as to confine the flow of fluids from separate sources to their respective passageways, as the sealing rings engage corresponding opposed sealing surfaces on rotating seal seats, the pressure of the fluid moving past any of the sealing rings being substantially balanced by opposed radial surfaces on each of the sealing rings so that each set of relatively rotatable sealing surfaces is maintained under a substantially constant predetermined pressure at all times.

In the drawings and specification there have been set forth preferred embodiments of the invention and, although specific terms are employed, they are used in a generic and descriptive sense only and not for purposes of limitation, the scope of the invention being defined in the claims.

We claim:

1. A rotary connector comprising inner and outer coaxial bodies, said outer body being in the form of a rotary housing journaled on said inner body for rotation with respect thereto and having at least one passageway therein, said inner body being stationary, one end of said stationary inner body extending axially beyond said rotary housing and having an axial bore therein, said inner body being provided with a pair of transverse ports adjacent said one end thereof, said ports opening to the exterior of said inner body at positions spaced axially outwardly of said rotary housing and being adapted to receive a pair of fluid conduits to be connected to said stationary inner body adjacent said one end thereof, a stationary tubular core received in said bore in spaced relation to said stationary inner body, means fixing said stationary tubular core to said one end of said stationary inner body, said stationary tubular core extending beyond the other end of said stationary inner body, an annular rotary seal seat fixed in said rotary housing and encircling said stationary tubular core in spaced relationship with respect thereto, a pair of axially opposed sealing rings having proximal surfaces engageable with opposite sides of said rotary seal seat, said sealing rings encircling said stationary tubular core, one of said pair of sealing rings also encircling the other end of said stationary inner body, means sealing said one sealing ring with respect to the other end of said stationary inner body and means sealing the other sealing ring with respect to said stationary tubular core, means for preventing relative rotation between said sealing rings and said stationary tubular core while permitting said sealing rings to move axially with respect thereto, spring means urging said non-rotative sealing rings against the opposite sides of said rotary seal seat into sealing engagement therewith, one of said ports communicating with the interior of said stationary tubular core to define a first fluid path through the rotary connector, the other port communicating with the portion of said axial bore between said stationary tubular core and said stationary inner body, said rotary seal seat having a plurality of radial perforations therethrough, the outer ends of said perforations communicating with said passageway in said rotary housing and the inner ends of said perforations communicating with the portion of the axial bore between said stationary tubular core and said stationary inner body to define a second fluid path through the rotary fluid connector independent of the first fluid path.

2. A rotary connector comprising inner and outer coaxial bodies, said outer body being in the form of a rotary housing journaled on said inner body for rotation with respect thereto and having at least one passageway therein, said inner body being stationary, one end of said stationary inner body extending axially beyond said rotary housing and having an axial bore therein, said inner body being provided with a pair of transverse ports adjacent said one end thereof, said ports opening to the exterior of said inner body at positions spaced axially outwardly of said rotary housing and being adapted to receive a pair of fluid conduits to be connected to said stationary inner body adjacent said one end thereof, a stationary tubular core received in said bore in spaced relation to said stationary inner body, means fixing said stationary tubular core to said one end of said stationary inner body, said stationary tubular core extending beyond the other end of said stationary inner body, a pair of axially spaced annular inner and outer rotary seal seats fixed in said rotary housing and encircling said stationary tubular core in spaced relationship with respect thereto, said outer rotary seal seat also encircling said stationary inner body adjacent the other end thereof, a pair of sealing rings positioned between said pair of rotary seal seats, said pair of sealing rings having distal sealing surfaces engageable with the proximal sides of said pair of rotary seal seats, said pair of sealing rings encircling said stationary tubular core, the one of said pair of sealing rings having its sealing surface engageable with said outer rotary seal seat also encircling the other end of said stationary inner body, means sealing said one sealing ring with respect to the other end of said stationary inner body and means sealing the other sealing ring with respect to said stationary tubular core, means for preventing relative rotation between said pair of sealing rings and said stationary tubular core while permitting said pair of sealing rings to move axially with respect thereto, spring means urging said pair of non-rotative sealing rings in opposite axial directions against the proximal sides of said pair of rotary seal seats into sealing engagement therewith, one of said ports communicating with the interior of said stationary tubular core to define a first fluid path through the rotary connector, the other port communicating with the portion of said axial bore between said stationary tubular core and said stationary inner body, said pairs of rotary seal seats and non-rotative sealing rings cooperating to define a pressure chamber closed at each end, said pressure chamber communicating with said passageway in said rotary housing and with the portion of the axial bore between said stationary tubular core and said stationary inner body to define a second fluid path through the rotary fluid connector indepent of the first fluid path.

3. A rotary connector comprising inner and outer coaxial bodies, said outer body being in the form of a rotary housing journaled on said inner body for rotation with respect thereto and having at least one passageway therein, said inner body being stationary, one end of said stationary inner body extending axially beyond said rotary housing and having an axial bore therein, said inner body being provided with a pair of transverse ports adjacent said one end thereof, said ports opening to the exterior of said inner body at positions spaced axially outwardly of said rotary housing and being adapted to receive a pair of fluid conduits to be connected to said stationary inner body adjacent said one end thereof, a stationary tubular core received in said bore in spaced relation to said stationary inner body, means fixing said stationary tubular core to said one end of said stationary inner body, said stationary tubular core extending beyond the other end of said stationary inner body, a pair of axially spaced annular inner and outer rotary seal seats fixed in said rotary housing and encircling said stationary tubular core in spaced relationship with respect thereto, said outer rotary seal seat also encircling said stationary inner body adjacent the other end thereof, a pair of sealing rings positioned between said pair of rotary seal seats, said pair of sealing rings having distal sealing surfaces engageable with the proximal sides of said pair of rotary seal seats, said pair of sealing rings encircling said stationary tubular core, the one of said pair of sealing rings having its sealing surface engageable with said outer rotary seal seat also encircling the other end of said stationary inner body, means sealing said one sealing ring with respect to the other end of said stationary inner body and means sealing the other sealing ring of said pair of sealing rings with respect to said stationary tubular core, means for preventing relative rotation between said pair of sealing rings and said stationary tubular core while permitting said pair of sealing rings to move axially with respect thereto, spring means urging said pair of non-rotative sealing rings in opposite axial directions against the proximal sides of said pair of rotary seal seats into sealing engagement therewith, said pairs of rotary seal seats and non-rotative sealing rings cooperating to define a pressure chamber closed at each end, a third sealing ring encircling said stationary tubular core and having a sealing surface engageable with the opposite side of said inner rotary seat, means sealing said third sealing ring with respect to said stationary tubular core, means for preventing rotation while permitting axial movement of said third sealing ring relative to said stationary tubular core, spring means urging said third non-rotative sealing ring axially against the opposite side of said inner rotary seal seat into sealing engagement therewith, one of said ports communicating with the interior of said stationary tubular core to define a first fluid path through the rotary connector, the other port communicating with the portion of said axial bore between said stationary tubular core and said stationary inner body, and said pressure chamber communicating with said passageway in said rotary housing and with the portion of the axial bore between said stationary tubular core and said stationary inner body to define a second fluid path through the rotary fluid connector independent of the first fluid path.

References Cited in the file of this patent

UNITED STATES PATENTS

| | | |
|---|---|---|
| 2,384,281 | Carter | Sept. 4, 1945 |
| 2,479,265 | Roshong | Aug. 16, 1949 |
| 2,489,212 | Zwack | Nov. 22, 1949 |
| 2,577,858 | Sampson | Dec. 11, 1951 |
| 2,626,166 | Fawick | Jan. 20, 1953 |
| 2,637,491 | Fitzsimmons | May 5, 1953 |
| 2,672,357 | Voytech | Mar. 16, 1954 |
| 2,758,850 | Becker | Aug. 14, 1956 |
| 2,836,440 | Brumagim | May 27, 1958 |
| 2,877,026 | Payne et al. | Mar. 10, 1959 |
| 2,985,468 | Shaw et al. | May 23, 1961 |